Feb. 14, 1961

J. GRAW 2,971,731

EJECTION CONTAINER FOR RADIO PROBES

Filed March 8, 1956

Inventor
J. Graw

2,971,731
EJECTION CONTAINER FOR RADIO PROBES

Josef Graw, Nurnberg, Germany, assignor to Dr. Graw Messgerate G.m.b.H., Nurnberg, Germany Filed Mar. 8, 1956, Ser. No. 570,360

Claims priority, application Germany Mar. 10, 1955

1 Claim. (Cl. 244—137)

Radio probes measure the atmospheric pressure, the temperature and the humidity of the atmosphere up to great heights, and transmit the observations by means of a small radio transmitter to radio receiver posts. The radio probes are carried upward either by means of a rubber balloon filled with hydrogen, or they are ejected from an aeroplane at a great height, and drop to ground level suspended from a parachute, while they constantly carry out measurements and transmit the observations. Such radio probes are mostly ejected by hand from the bottom hatch of the aeroplane. In the case of aeroplanes which are not equipped with a bottom hatch, the probes are fixed underneath the aeroplane and detached by electrical means. In order to eject consecutively several probes during one fllight, several single containers are sometimes also fixed to the aeroplane body, each container containing one radio probe and opened during the flight so that its probe can be ejected. These known methods and devices for ejecting radio probes are laborious to operate and carry out, and meet with considerable difficulties, particularly in the case of very fast moving aeroplanes.

It is the purpose of the invention to facilitate the ejection of radio probes at equal intervals from an aeroplane. It has also the purpose of enabling a larger number of radio probes to be fixed to very fast aeroplanes, and to be dropped consecutively.

The invention refers accordingly to an ejection container for radio probes, which is to be fixed to the underside of the aeroplane hull. The invention consists in an approximately cigar-shaped container being provided with a drum with several loading spaces for several probes, and the container being provided with an opening arranged so that every time the drum is rotated, a probe is ejected, until all probes have been ejected consecutively from the opening.

The invention comprises also a convenient design of ejection containers of this kind.

Figure 1:
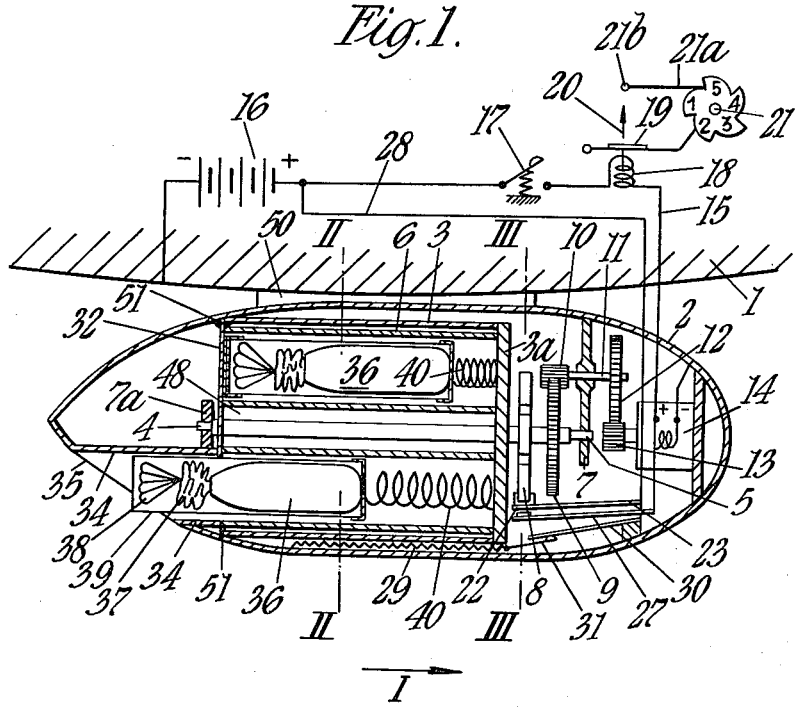

The invention will be better understood from the following example, which should be taken in conjunction with the accompanying drawings comprising:

Fig. 1, showing a container according to the invention, for radio probes, shown as a longitudinal section with the radio probes inserted.

Figures 2, 3:
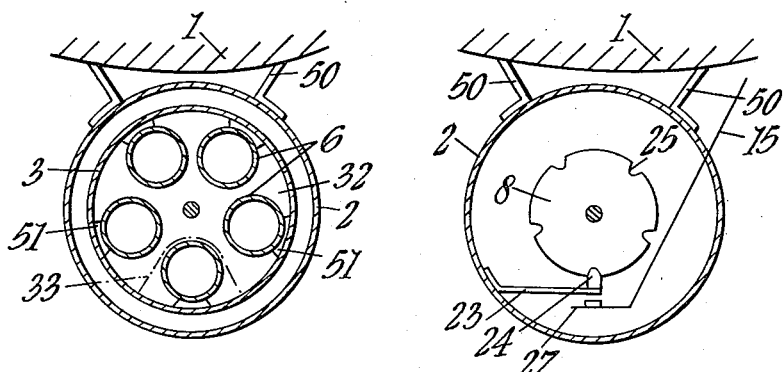

Fig. 2, which is a section along the line II—II of Fig. 1, without the radio probes, Fig. 3, a section along the line III—III of Fig. 1.

In the embodiment according to Figs. 1 to 3, an ejection container 2 is fixed to an aeroplane hull 1 by means of brackets 50, which are not shown. The container 2 is shaped approximately like a cigar or a drop of liquid, so that it offers only very little resistance to the air as the plane is travelling in the direction of the arrow I. The container 2 supports a drum 3 on two trunnions 4 and 5 in the supports 7 and 7a, firmly fixed inside the container 2. The drum 3 accommodates five circular containers 6, which are closed on the right-hand side by the front face 3a of the drum 3, while their left-hand ends are open, as shown in Fig. 1. The containers are attached directly to the front face 3a; the left-hand ends of the containers are secured to the drum 3 by means of fillets 51. The left-hand end of the drum 3 is in sliding contact with the container 2. A notched wheel 8, whose shape is particularly clearly indicated in Fig. 3, is fixed to the trunnion 5 of the drum 3. Also, a gear wheel 9 is fixed to the trunnion 5, and a pinion 10 supported on a shaft 11 meshes with the gear wheel 9. The shaft 11 rests in the support 7 and carries at its other end a gear wheel 12 meshing with a pinion 13, which can be driven by a motor 14. The negative pole of the motor is connected to earth, on the container 2, and its positive pole is connected to a conductor 15, whose other end is connected to a battery 16 of electrical secondary cells. A push-button switch 17 is connected into the conductor 15, and can be closed by hand; it opens automatically when it is released by the operator. Also, a coil 18 is provided in the conductor 15, which moves a pawl 19 in the direction of the arrow 20, when it is energized. This pawl rotates then a notched wheel 21 by 72°, so that the number of ejections already carried out can always be observed on the notched wheel. A latch 21a, which is pivoted on a shaft 21b fixed to the structure of the aeroplane, prevents a rotation of the notched wheel in the anti-clockwise direction. A switch 22 is also connected into the conductor 15. This switch consists of a spring-loaded indexing lever 23 with a pin or stop member 24, which is pushed by the lever 23 against the notched disk 8, and engages with one of the notches 25 of the notched disk 8, when this disk rotates. The switch 22 is employed to switch off the motor 14 as soon as the motor has rotated the drum 6 by ⅕ of a complete revolution. A fixed contact 27 is also connected to the conductor 15, like the positive pole of the electric motor 14, while the lever 23 is connected directly to the positive pole of the battery 16 through the conductor 28, the pin 24 being made of insulating material or electrically insulated from the lever 23. The lever 23 is electrically insulated from the container 2. Also, electric heaters 29 are provided, which obtain their current from a thermostat 30, which may, for instance, take the shape of a bimetal device, so that the thermostat 30 pushes against the contact 31 of the heater coil 29, when the temperature in the container drops below +20° C., and the heating coil 29 is supplied with current and the inside of the container is heated.

The rear end of the drum 3 is closed by a closing wall or plate 32, which is provided with only one opening, corresponding approximately to the chain-dotted line 33 in Fig. 2. The wall 32 is welded to the container 2. An ejection channel is connected to this recess; this channel has the shape of a tube 34 in the present case. The channel penetrates at 35 the outside wall of the container 2. Each radio probe 36 is now fitted with its aerial 37 and a parachute 38 into an envelope 39. One such envelope 39 with contents is accommodated in each loading space 6. A spring 40 is compressed when the envelope is inserted into the loading space. Therefore, at the moment when the drum 3 is turned into a position in which the envelope 39 can leave the container through the forward opening 33 of the wall 32, the spring 40 will eject one of these envelopse from the container 2 towards the rear. In order to effect this, the operator presses the push button 17, so that the counting device 21 rotates by 72°, and the motor 14 is supplied with current. The motor rotates then the drum 3 through the gear wheels 13, 12, 10, 9 about 72°, so that the next envelope 36 is ejected. When the rotation of the drum 3 commences, the pin 24 is pushed out of the notch 25, so that the pawl 23 is moved against the contact 27. The positive pole of the motor 14 continues therefore to be supplied with current through 28, 23, and 27, even when the operator has released the switch 17, so that the conductor 15 is interrupted. Since the pin 24 moves into a notch 25 at the moment at which the envelope 29 is being ejected, the pawl 23 is lifted off the contact 27, so that the conductor 28 to the positive pole of the motor is interrupted at the contacts 23 and 27. Since meanwhile also the conductor 15 has been interrupted by the automatic opening action of the switch 17, the motor 14 is stopped.

What I claim is:

In a fast-flying aircraft, apparatus for ejecting loads of low specific weight such as radiosondes, comprising a container mounted on the exterior of the aircraft and having the major portion of its exterior of streamlined form and symmetrical about an axis extending in the normal direction of flight of the aircraft, a drum rotatably mounted in the container about an axis extending in the normal direction of flight of the aircraft, said drum being provided with a turning device and an electric motor energised via electric conductors from a source within the aircraft, said turning device and said motor being situated within said container, and with a plurality of circumferentially spaced axially extending cylinders for accommodating the respective loads, said cylinders having open rear ends, a wall having an opening in its lower portion fixedly mounted in the container across the open ends of the cylinders, an opening in the rear wall of the container in alignment with the opening in the wall, spring means within each cylinder continuously urging the load rearwardly against said wall whereby, upon adjustment of the drum to align the lowermost cylinder with the opening in the wall, the load will be ejected rearwardly from said cylinder.

References Cited in the file of this patent

UNITED STATES PATENTS

| | | |
|---|---|---|
| 278,005 | Fredricks et al. | May 22, 1883 |
| 2,328,304 | Sorensen | Aug. 31, 1943 |
| 2,359,787 | Peters et al. | Oct. 10, 1944 |
| 2,378,816 | Wild | June 19, 1945 |
| 2,409,653 | Amdur | Oct. 22, 1946 |
| 2,470,120 | Walker | May 17, 1949 |
| 2,625,927 | Rosenbloom | Jan. 20, 1953 |
| 2,646,786 | Robertson | July 28, 1953 |
| 2,660,656 | Wilkie | Nov. 24, 1953 |
| 2,876,678 | Lyon | Mar. 10, 1959 |

FOREIGN PATENTS

| | | |
|---|---|---|
| 15,871 | Great Britain | 1913 |
| 277,696 | Germany | Aug. 25, 1914 |
| 461,814 | Great Britain | Feb. 24, 1937 |
| 712,248 | Great Britain | July 21, 1954 |
| 730,654 | Germany | Jan. 15, 1943 |